United States Patent [19]

Pizzuti

[11] 4,387,978
[45] Jun. 14, 1983

[54] FOLDING CAMERA WITH PIVOTALLY MOUNTED VIEWFINDER

[75] Inventor: Donato F. Pizzuti, Lynnfield, Mass.

[73] Assignee: Polaroid Corporation, Cambridge, Mass.

[21] Appl. No.: 334,981

[22] Filed: Dec. 28, 1981

[51] Int. Cl.³ ...................... G03B 13/02; G03B 17/04
[52] U.S. Cl. .................................... 354/187; 354/219
[58] Field of Search ............... 354/187, 192, 193, 194, 354/219, 223, 158

[56] References Cited

U.S. PATENT DOCUMENTS

| | | |
|---|---|---|
| 3,415,644 | 12/1968 | Land . |
| 3,479,941 | 11/1969 | Erlichman .......................... 354/187 |
| 3,589,253 | 6/1971 | Erlichman .......................... 354/187 |
| 3,594,165 | 7/1971 | Rogers . |
| 3,610,123 | 10/1971 | Bellows ............................. 354/219 |
| 3,683,770 | 8/1972 | Land ................................. 354/187 |
| 3,709,131 | 1/1973 | Plummer ............................ 354/158 |
| 3,722,389 | 3/1973 | Costa et al. ........................ 354/187 |
| 3,761,268 | 9/1973 | Land et al. . |
| 3,877,046 | 4/1975 | Sorimachi et al. .................. 354/187 |
| 3,971,052 | 7/1976 | Plummer ............................ 354/219 |
| 4,166,683 | 9/1979 | Yazaki ............................... 354/192 |

FOREIGN PATENT DOCUMENTS 694711 7/1953 United Kingdom ................ 354/187

Primary Examiner—Alan Mathews
Attorney, Agent, or Firm—John S. Vale

[57] ABSTRACT

A compact folding camera having a mirror in its exposure optical path includes a self-erecting and folding viewfinder. Major camera components include a base housing section having a film plane therein, a pivoting lens housing, near one end of the film plane, mounting an objective lens, a pivoting mirror assembly, near the opposite end of the film plane, for reflecting light from the lens onto the film plane to expose a film unit thereat, a cover housing section, and an elongated viewfinder pivotally mounted on the cover section. When the camera is erected, the forward end of the viewfinder engages a locating surface on the lens housing to accurately locate the viewfinder with respect to the objective lens. As the camera is folded, the lens housing pivots back down over the film plane and the viewfinder pivots into a recess provided in the lens housing to accommodate the viewfinder when the camera is in its folded storage position.

8 Claims, 7 Drawing Figures

FOLDING CAMERA WITH PIVOTALLY MOUNTED VIEWFINDER

CROSS-REFERENCE TO RELATED APPLICATIONS

Certain aspects of the camera disclosed herein are disclosed and claimed in commonly-assigned copending applications U.S. Ser. Nos. 334,979, 334,980, and 334,982 filed on even date herewith.

BACKGROUND OF THE INVENTION

The present invention relates to the field of photography and, more particularly, to folding cameras having a mirror in the exposure optical path and also including a self-erecting and folding viewfinder for viewing and framing the scene to be photographed.

Integral self-developing film units of the general type disclosed in commonly-assigned U.S. Pat. Nos. 3,415,664; 3,594,165 and 3,761,268 and marketed by Polaroid Corporation, Cambridge, Massachusetts, under the tradename SX-70, Time Zero and 600 High Speed Land film, are exposed and viewed through the same side of the film unit thereby requiring an odd number of image reversals in the exposure optical path for correct image orientation.

Most commonly, cameras designed for this type of film include a horizontal base section for supporting a film pack with the forwardmost film unit therein located at the camera's film or exposure plane; an upstanding lens and shutter housing located at the forward end of the base section and mounting an objective lens with its optical axis generally parallel, or at some other non-perpendicular angle, to the film plane; and a mirror mounted at the opposite end of the base section with its forwardly directed reflective surface inclined at an appropriate angle with respect to the film plane and lens axis to reflect image forming light from the lens down onto the film unit for exposure. The mirror thus provides the necessary additional image reversal and also allows the relatively long optical path required for focusing an image on a snapshot sized film unit to be folded thereby making the camera more compact in its exposure configuration.

Representative examples of folding cameras of this general type having a variety of different folding viewfinders or viewfinder assemblies may be found in U.S. Pat. Nos. 3,479,941; 3,589,253; 3,683,770; 3,722,389; 3,877,046 and 4,166,683.

Typically, these cameras include a base section, a lens and shutter housing pivotally coupled to one end of the base section, a cover section, supporting the mirror, pivotally coupled to the opposite end of the base section, and a folding bellows disposed therebetween. When the camera is erected, the lens and shutter housing is located in upstanding relation to the forward end of the base section and the cover section is inclined upwardly to set the mirror at the proper angle with respect to the lens axis and the film plane in the base section. The bellows is erected between the housing sections to block ambient light from the exposure optical path.

As the camera is folded, the lens and shutter housing pivots forwardly and downwardly in front of the forward end of the base housing section to assume its storage position is substantially coplanar end-to-end relation therewith and the cover section folds down into overlying relation with the base section. The bellows folds into a flat configuration and is stored therebetween.

A common basic design feature in the folding schemes employed in all of the cameras disclosed in the above-noted patents is that the two largest (by volume) housing sections—the base housing section for receiving the film pack and the lens and shutter housing—are arranged in longitudinally extending, generally coplanar end-to-end relation when the camera is in its folded position. This maximizes the length of the folded camera in the interest of minimizing its height or thickness dimension.

The relative folded storage positions of these two major housing sections determines the overall philosophy of the camera folding scheme into which the other components—cover housing section, mirror, bellows and viewfinder—must be integrated in a compatible manner.

The above-noted prior art cameras employ a variety of different types of viewfinders or viewfinder assemblies which are integrated into the folding scheme in a manner that is compatible with the end-to-end placement of the base section and lens end shutter housing.

For example, the cameras disclosed in U.S. Pat. Nos. 3,479,941 and 3,683,770 have a unified elongated direct viewfinder built into one side of the cover housing section for movement therewith between the erected and storage positions. The term "unified viewfinder" means that all of the viewfinder optical elements are mounted on a common structure and move as a unit, while remaining in optical alignment, when the camera is folded and erected.

The camera disclosed in U.S. Pat. No. 3,589,253 mounts a unified viewfinder on an elongated movable erecting link and includes a recess provided at the trailing end of the cover section for receiving the viewfinder therein when the camera is folded. In U.S. Pat. No. 3,877,046, the unified viewfinder is mounted on and moves with the lens and shutter housing.

Other cameras of this type are provided with a divided viewfinder assembly wherein front and rear optical elements, or groups of elements, are mounted on different camera components for independent movement between a folded storage position where the elements are not in functioning optical alignment and an operative erected position wherein the elements are in optical alignment to form the viewfinder.

For example, the camera disclosed in U.S. Pat. No. 3,722,389 employs a single lens reflex viewing system wherein light transmitted through the objective lens is reflected from a mirror onto a viewing and focusing screen and then to a viewfinder assembly comprising an asymmetric mirror and rear eyelens. The objective lens is mounted on the lens and shutter housing, the mirror is mounted on the cover housing section, the focusing screen is located in the base section over the film plane and the viewing assembly is mounted on a short cover section. The viewing assembly comprising the asymmetric mirror and rear lens is not completely self-erecting in that its overlying cover must be manually unlatched by the camera operator in preparation for erecting the camera and also must be manually folded and latched as the final step in locating the interconnected housing sections in the folded storage position. In U.S. Pat. No. 4,166,683, a front group of viewfinder lens elements are mounted on the lens and shutter housing to one side of the objective lens and a group of rear lens elements are aligned in a tubular structure that is pivotally mounted on the cover section. When the camera is erected, the front and rear groups are in optical alignment to form a direct viewing viewfinder. When the camera is folded, the forward group of lens elements rotates downwardly with the lens and shutter housing into its end-to-end relationship with the base section and the tube mounting the rear elements pivots into a storage position located between the base section and the closed cover section.

Obviously, if a folding viewfinder is to function effectively it must be accurately positioned with respect to the objective lens when the camera is in its operative erected position.

The present invention relates to a folding camera that includes a mirror in the exposure optical path for providing correct image orientation in the final print but employs a folding scheme that differs from those described above in that the lens and shutter housing is configured to fold back over the base housing section to assume a folded storage position overlying the film plane. Thus, the two major housing sections are arranged in stacked, rather than in end-to-end, relationship to minimize the length of the folded camera while making it somewhat thicker.

Therefore, it is an object of the present invention to provide such a folding camera wherein the lens housing is folded back over the base section for storage and the other major components of the camera, including a self-erecting and folding viewfinder, are integrated therewith in a manner that is compatible with this folding scheme.

Another object is to provide such a camera that is simply constructed and easy to use.

Yet another object is to provide such a camera including structure for accurately locating the self-erecting and folding viewfinder in operative relation with the objective lens when the camera is in its erected position.

Other objects of the invention will, in part, be obvious and will, in part, appear hereinafter.

SUMMARY OF THE INVENTION

The present invention provides a folding camera including a self-erecting and folding viewfinder. Major camera components include a base housing section; a lens housing section mounting an objective lens; a mirror assembly; a foldable bellows; a cover housing section; first and second erecting means interconnecting the lens and cover housing sections and the mirror assembly for coordinated movement between erected and storage positions; a viewfinder and third erecting means responsive to movement of the cover housing section for effecting movement of the viewfinder between its erected and storage positions.

The base housing section includes means for supporting a film unit at a film plane therein.

The lens housing is pivotally coupled to the base section, adjacent one end thereof, for movement between an upstanding operative erected position and a folded storage position wherein it is folded back over the base section in overlying relation to at least a portion of the film plane. The lens housing section also includes means configured to be engaged by the viewfinder for locating it in a predetermined operative orientation with respect to the objective lens.

The mirror assembly includes a mirror pivotally coupled to the base section, adjacent an opposite end thereof, for movement between an operative erected position for reflecting image forming light rays from the lens onto the film plane to expose a film unit thereat and a folded storage position overlying at least a portion of the film plane.

The bellows is attached to the base and lens housing sections and also the mirror assembly for movement, in response to movement of the lens housing section and mirror assembly, between an erect position wherein it light shields the exposure optical path between the lens, mirror and film plane, and a folded storage position wherein it assumes a substantially flat configuration with at least a portion thereof overlying the film plane.

The cover housing section is pivotally coupled to the base section adjacent the opposite end thereof for movement between an erected position providing clearance for the lens housing section, mirror assembly and bellows to assume their respective erected positions and a folded storage position overlying the base section and protectively covering the folded lens housing section, mirror assembly and bellows.

The first erecting means interconnects the lens and cover housing sections for coordinated movement between their respective erected and storage positions. The second erecting means interconnects the lens housing section and the mirror assembly for coordinated movement between their respective erected and storage positions.

The viewfinder is pivotally mounted on the cover section for movement between an operative erected position wherein at least a portion of the viewfinder engages the locating means on the lens housing section to locate the viewfinder in its predetermined orientation with respect to the objective lens for viewing and framing a scene in the field of view of the objective lens, and a folded storage position where at least a portion of the viewfinder overlies a portion of the lens housing located in its folded storage position.

The third erecting means includes the locating means and is responsive to movement of the cover section from its storage position to its erected position for effecting movement of the viewfinder from its storage position to its erected position and is also responsive to movement of the cover section from its erected position to its storage position for effecting movement of the viewfinder from its erected position to its storge position.

In a preferred embodiment, the viewfinder is of the unified type including an elongated tube mounting a front viewfinder lens at the leading end thereof and a rear viewfinder lens at the trailing end thereof. The cover housing section includes an aperture therein and the viewfinder is mounted on the cover section so as to extend through the aperture with the leading end of the tube in engagement with the locating means on the lens housing when the camera is erected.

The locating means preferably includes a bearing surface formed on a viewfinder supporting and locating pillar on the lens housing section. The viewfinder is spring biased towards its erected position so that the leading end of the viewfinder tube is urged into contact with the bearing surface. Advantageously, the bearing surface is arranged in a fixed predetermined spatial relationship with the objective lens to accurately position the viewfinder with respect to the objective lens.

The pillar cooperates with the main portion of the lens housing section to define a recess therein for receiving at least a portion of the viewfinder when the camera is in its folded storage position.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
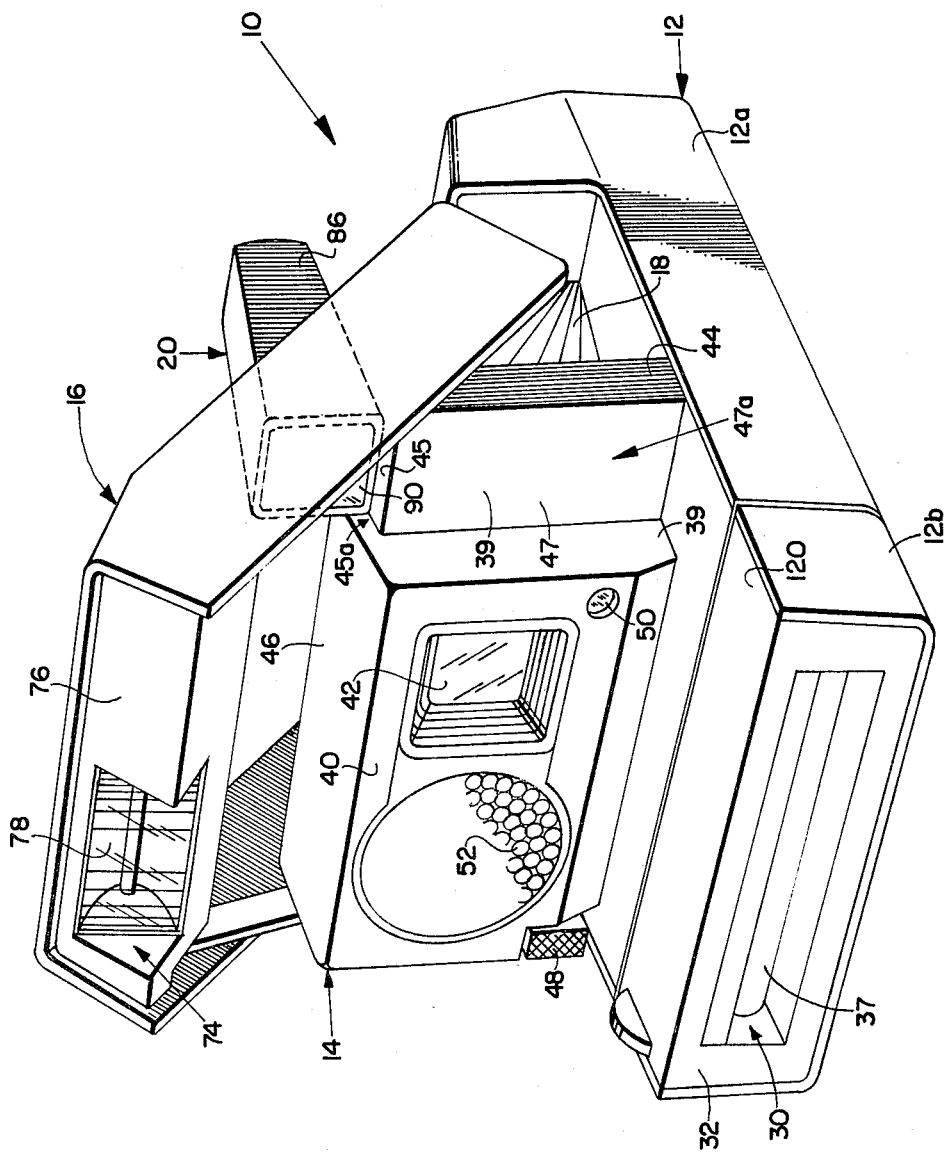
FIG. 1 is a front perspective view of the folding camera embodying the present invention shown in its erected operative configuration.
Figure 2:
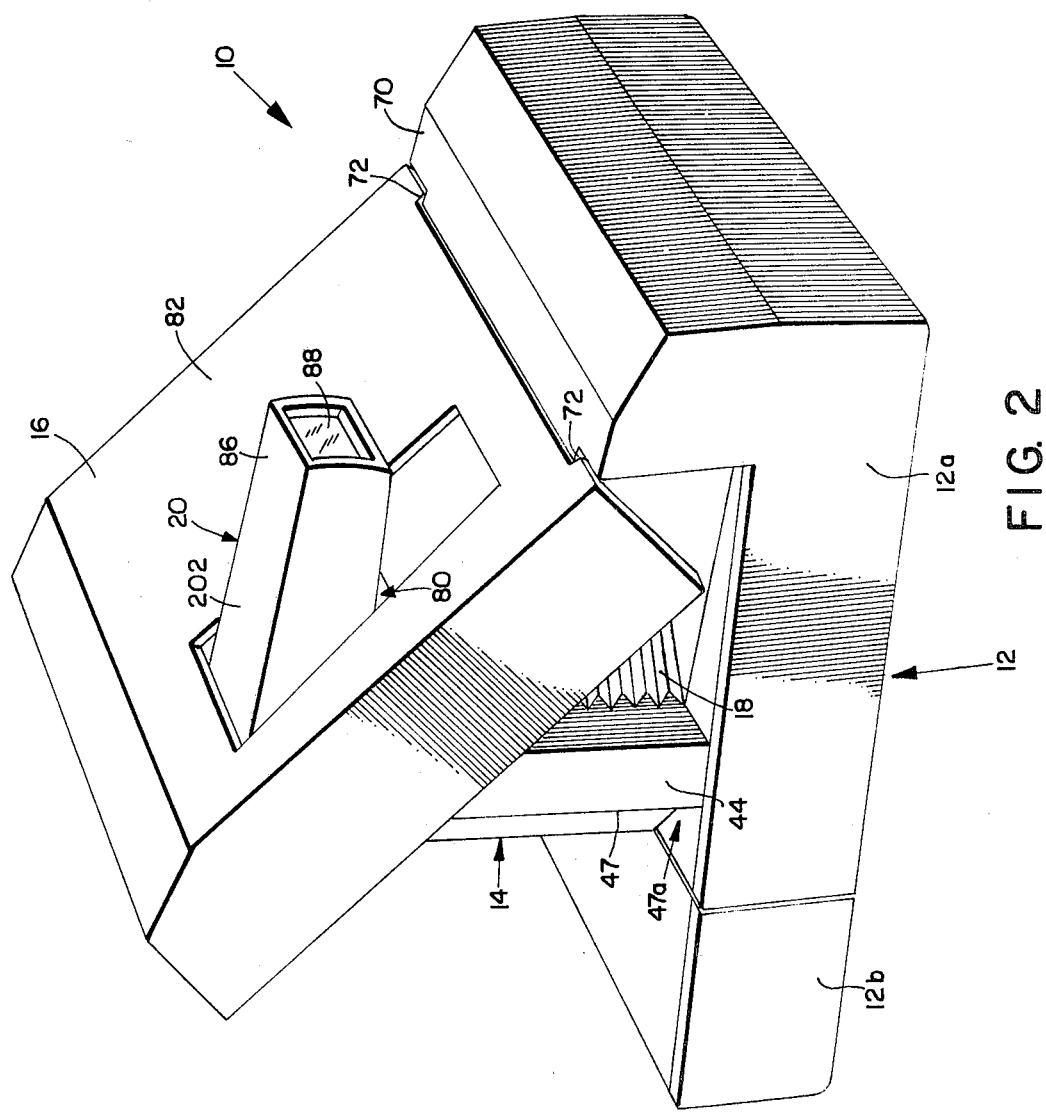
FIG. 2 is a rear perspective view of the erected camera of FIG. 1.
Figure 3:
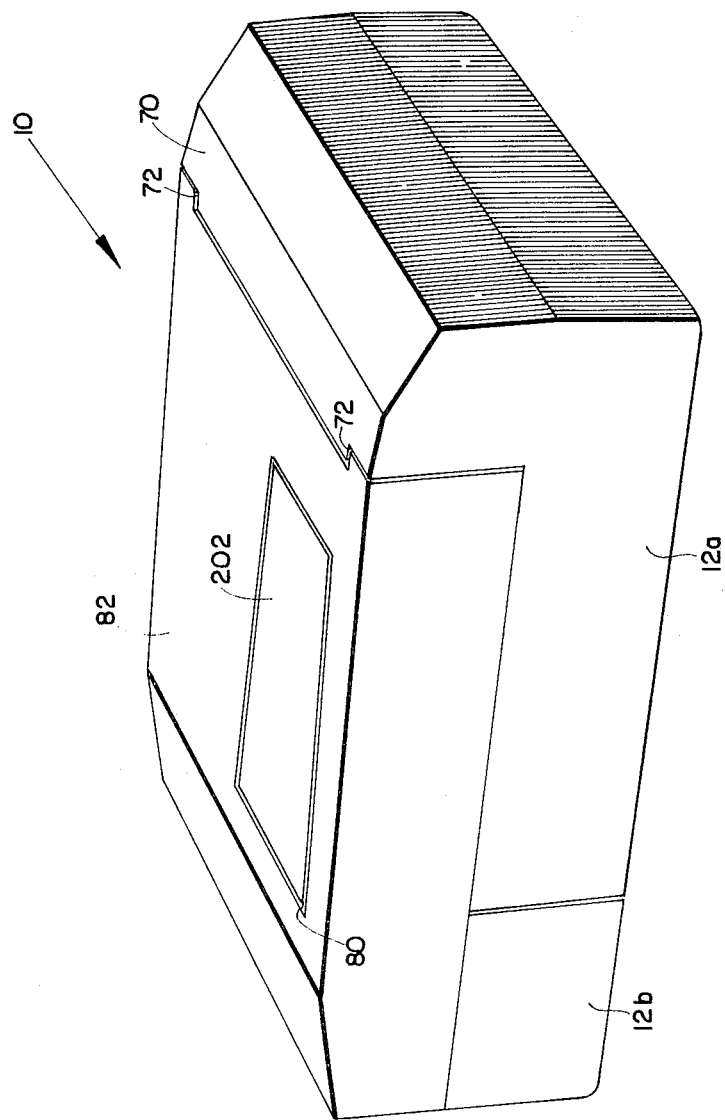
FIG. 3 is a perspective view of the camera embodying the present invention shown in its folded storage position.
Figure 4:
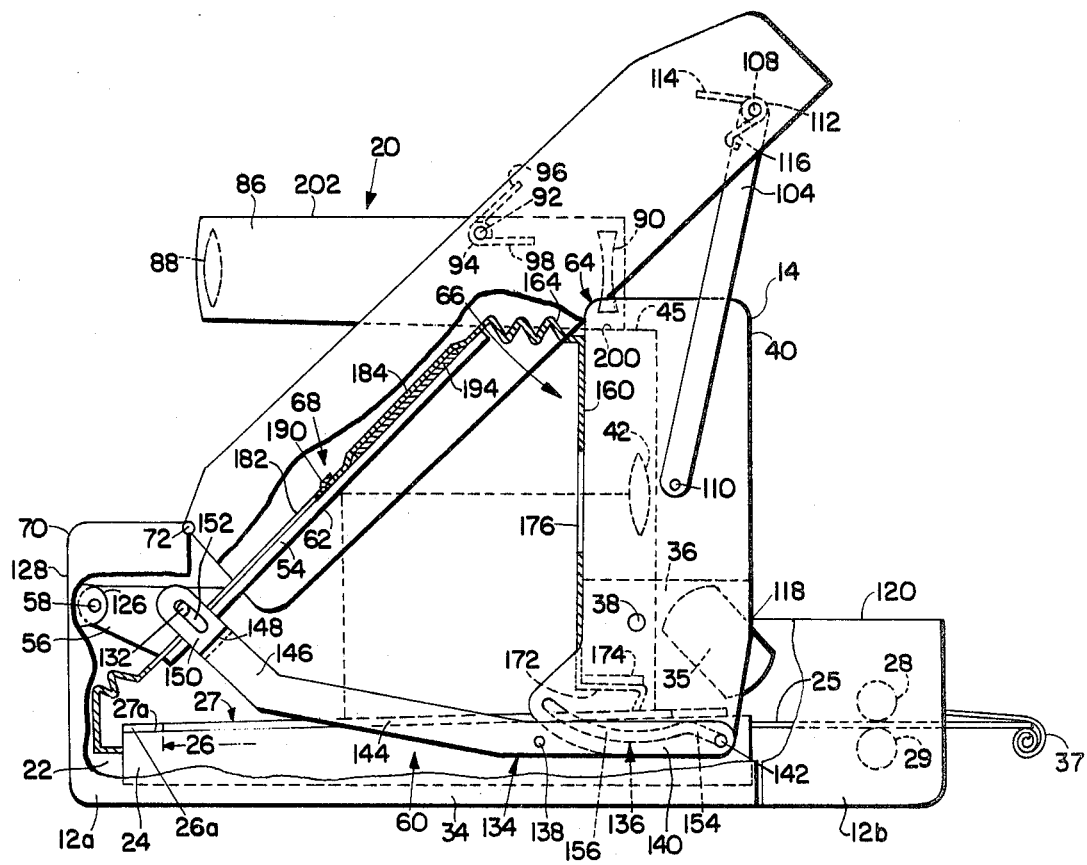
FIG. 4 is a right-side elevational view, partly cut away, to show various components of the erected camera.
Figure 5:
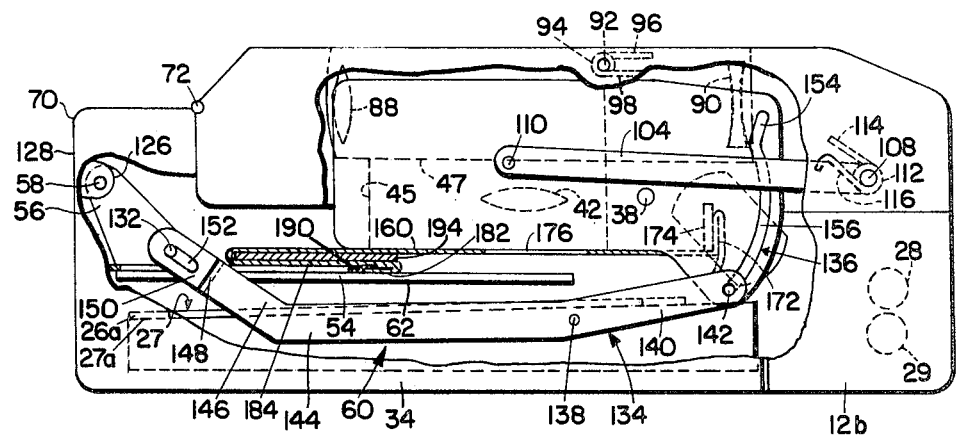
FIG. 5 is a right-side elevational view, partly cut away, showing the components of FIG. 4 in their folded storage positions.

A compact folding camera 10 embodying the present invention is shown in its operative erected position in FIGS. 1, 2 and 4, and in its inoperative folded storage position in FIGS. 3 and 5.

The major structural components of camera 10 include a plurality of interconnected housing sections 12, 14 and 16, a folding light opaque bellows 18, and a folding viewfinder 20.

In the illustrated embodiment, camera 10 is of the self-developing type for exposing and processing integral self-developing snapshot size film units which are exposed and viewed through the front side thereof and therefore require one, or an odd number of, additional image reversals in the exposure optical path for correct image orientation in the final positive print. Representative examples of such self-developing film units are disclosed in commonly-assigned U.S. Pat. Nos. 3,415,664; 3,594,165; and 3,761,268. These film units generally are supplied in a cassette or film container which also includes a flat battery underlying the stack of film units for powering the camera's electrical system. For representative examples of such cassettes, see commonly-assigned U.S. Pat. Nos. 3,779,770 and 3,948,662.

Section 12 is a base housing section comprising a rear portion 12a having means for defining an open-ended chamber 22 therein for receiving and supporting a film cassette 24 so that a forwardmost one of the film units 25 therein (see FIG. 4) is located at the camera's film or exposure plane 26 underlying a rectangular exposure aperture 27 in the top wall 27a of cassette 24; and a forward portion 12b coupled to the leading end of portion 12a for pivotal motion relative thereto between its closed operative position (shown) wherein it supports a pair of laterally extending pressure applying rollers 28 and 29 between a film withdrawal slot at the leading end of cassette 24 and a film exit opening 30 in a leading end wall 32 of portion 12b (see FIG. 1); and an inoperative open position (not shown) wherein portion 12b is pivoted downwardly, in a clockwise direction (as viewed in FIG. 4), to provide access to an open leading end of portion 12a through which a film cassette 24 is moved to insert it into or withdraw it from receiving chamber 22. Portion 12b is releasably held in its closed position by a latch mechanism (not shown) which is released by manually actuating a latch release button (not shown) slidably mounted on the right side wall 34 of portion 12a.

The means for locating the forwardmost film unit 25 is cassette 24 at the film plane 26 in position for exposure includes a horizontal plate 26a forming the top wall of chamber 22 and having a central aperture therein through which an upstanding rib about the exposure aperture 27 in cassette 24 extends to position the film unit laterally and longitudinally with respect to the film plane 26. The forward wall 27a bears against the underside of plate 26a to locate the forwardmost film unit vertically with respect to the film plane 26. Springs (not shown) on the bottom wall of portion 12a engage the back wall of cassette 24 and urge the cassette upwardly to locate top wall 27a in abutting relation with the underside of plate 26a.

The top roller 28 is adapted to be rotatably driven by a small DC electrical motor 35 mounted on the leading end of an inner frame member (not shown) within portion 12a, and coupled to roller 28 through an elongated gear train (not shown) that extends along the right side of base section 12 outboard of the film receiving chamber 22 and the pressure-applying rollers 28 and 29. A well or recess 36 is provided in the lower portion of housing section 14 for accommodating motor 35.

The major portion of the gear train extends rearwardly into portion 12a from the interface between portions 12a and 12b and has a roller drive pinion (not shown) at its leading end. The drive pinion is drivingly engaged with a larger gear (not shown) fixed to the right end of roller 28 when portion 12b is located in its closed operative position to impart rotary motion to roller 28. This larger gear becomes disengaged from the drive pinion and pivots downwardly with portion 12b when it is opened for loading a cassette 24 into chamber 22.

At the trailing end of the gear train is a film advancing mechanism or pick (not shown) that extends into a slot at the trailing right-hand end of the cassette 24 and engages the rear edge of the forwardmost film unit 25. The pick is advanced forwardly by a pick drive cam or pin on one of the gears in the train when it rotates in response to being driven by motor 35. The forward motion of the pick advances the forwardmost film unit 25 through the film withdrawal slot in the leading end of cassette 24 and feeds the leading end of the film unit 25 into the bite of the pressure-applying rollers 28 and 29.

Following exposure of the forwardmost film unit 25 through aperture 27, the motor 34 is energized, preferably by the flat battery in cassette 24, and the exposed film unit is advanced by the pick into engagement with the rollers 28 and 29. Roller 28 is rotated in a counter-clockwise direction to advance the film unit 25 between the pressure-applying rollers and along a film exit path extending through the film exit opening 30 to the exterior of the camera 10.

The rollers 28 and 29 apply a compressive pressure to the film unit 25 as it is advanced therebetween for rupturing a pod at the leading end of the film unit and releasing therefrom an opaque fluid processing composition which is distributed between predetermined layers of the film unit to initiate a well-known development and diffusion transfer process. In the illustrated embodiment, as film unit 25 is advanced through the exit opening 30, it engages and uncoils a light opaque retractable frog's tongue 37 that protectively covers the emerging film unit to block the passage of ambient light rearwardly along transparent layers of the film unit thereby protecting the photosensitive portion of the film unit behind the rollers, which has not yet been covered with the processing fluid, from being fogged.

The components and systems in base housing section 12 for supporting a film unit 25, supplied in cassette 24, at the camera's film plane 26 in position for exposure, and for processing and ejecting the film unit from the camera following exposure are all well-known in the prior art and need not be described further here to understand the present invention. Representative examples of such components and systems suitable for use in camera 10 are disclosed in commonly-assigned U.S. Pat. Nos. 3,714,879; 3,967,304; 4,047,192; and 4,051,492, all of which are incorporated by reference herein.

The lens and shutter housing 14 is pivotally coupled to the inner frame within base housing section portion 12a adjacent the leading end of the film plane 26, at pivot pins 38 on the opposite lateral side walls 39 of housing section 14, for movement between the erected exposure position of FIGS. 1, 2 and 4 wherein it stands upright with respect to base housing section 12 and the flat or folded storage position of FIGS. 3 and 5 wherein housing section 14 is folded back over housing section 12 so as to overlie at least a portion of the film plane 26.

As best shown in FIG. 1, housing section 14 mounts, on a forward wall 40 thereof, an adjustable focus objective or taking lens 42; a camera cycle start button 48 that is manually actuable to initiate an automatic film exposure and processing cycle; a window 50 for transmitting scene light to a photocell within housing 14 forming part of the camera's automatic exposure control system; and an optional sonar transducer 52 forming part of an optional automatic ranging and lens focusing system.

Integrally formed with housing section 14 and extending outwardly from the left (as viewed from the rear of camera 10) side wall 39 thereof is a vertically disposed viewfinder support and locating pillar 44 for supporting the forward end of the viewfinder 20 when the camera is erected to accurately locate viewfinder 20 with respect to the objective lens 42 so that the field of view of viewfinder 20 covers a predetermined portion of the field of view of lens 42 for viewing and framing the scene to be photographed.

The forward end of the viewfinder is adapted to rest on a top wall 45 of pillar 44 which is lower than the adjacent top wall 46 of the main portion of the housing to define a notch 45a in cooperation with the upper adjacent end of side wall 39 for receiving the forward end of viewfinder 20.

It will be noted that the forward wall 47 of pillar 44 is set back from the forward wall 40 of the main portion of housing section 14 so as to define a recess 47a in housing section 14 for receiving and storing the viewfinder 20 when camera 10 is folded, as will become apparent later.

Located behind lens 42 is an electronically controlled shutter (not shown) for automatically regulating the transmission of image forming light rays through lens 42 to the film plane.

Figure 6:
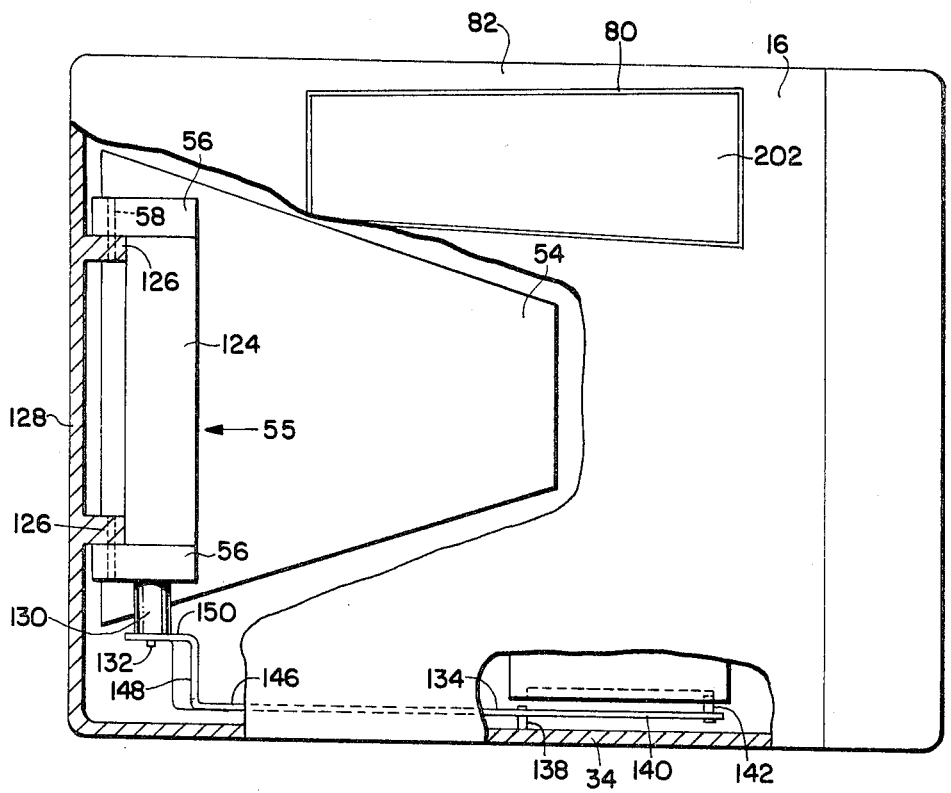
FIG. 6 is a plan view, partly cut away, of the camera embodying the present invention.

As best shown in FIGS. 4, 5 and 6, base housing section portion 12a also mounts a trapezoidal-shaped mirror 54 therein for reflecting image forming light rays from lens 42 onto a film unit 25 located at the exposure position. Mirror 54 is attached near its trailing or bottom end to a mirror support frame 55 having a pair of laterally spaced rearwardly extending arms 56 thereon that are pivotally coupled at pivot pins 58 in base housing section portion 12a adjacent the opposite or trailing end of the film plane 26 for movement between the erected inclined exposure position of FIG. 4 and the flat storage position of FIGS. 5 and 6. This mirror assembly is interconnected with lens and shutter housing section 14 by a linkage system 60, to be described later in detail, for mutual coordinated movement between their respective erected and folded positions.

When camera 10 is erected, the mirror 54 assumes an inclined exposure position over the film plane 26 with its front reflective surface 62 set at a predetermined angle with respect to the optic axis of lens 42 and a film plane 26 so that the reflected image forming light impinges the film plane at an angle that is normal thereto. In the illustrated embodiment, the erected housing section 14 is substantially perpendicular to the base section 12 so that the optic axis of lens 42 is parallel to the film plane 26, and the front surface 62 of the erected mirror 54 is set at an angle of 45° with respect to the optic axis and the film plane 26.

The mirror 54 serves two distinct purposes. First, it provides an additional image reversal in the exposure optical path so that the positive image in the final print has the correct orientation. It also serves to fold the optical path between lens 42 and the film plane 26 to make the erected camera more compact.

As will become apparent later, the mirror assembly is pivoted toward its folded position ahead of housing section 14 so that the folded mirror 54 overlies at least a portion of the film plane 26 and is located between the film plane 26 and a rear wall 64 of housing section 14 located in its folded position.

Figure 7:
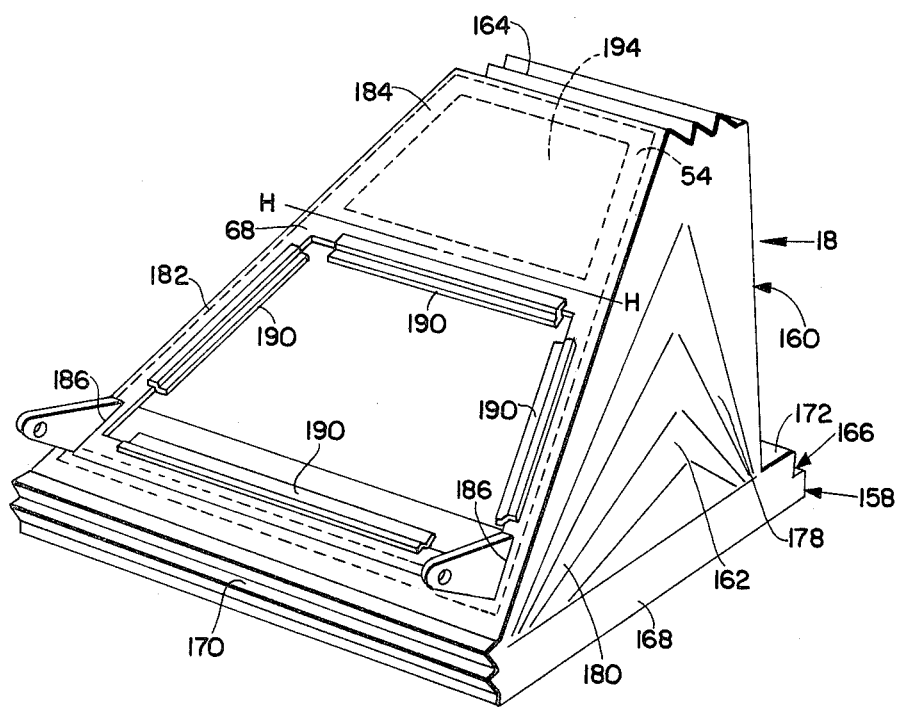
FIG. 7 is a perspective view of a folding bellows, forming part of said camera, shown in its erected position.

Coupled between the rear wall 64 of lens and shutter housing 14 and a peripheral section of the inner frame within base section portion 12a adjacent the film plane area is the flexible light opaque bellows 18 that is movable between the erected position of FIGS. 4 and 7 wherein it cooperates with base section portion 12a and housing section 14 to define a light excluding exposure chamber 66 surrounding the optical path from lens 42 to the film plane 26, and a folded storage position shown in FIG. 5 wherein bellows 18 is folded back on itself along a rear wall 68 thereof so that a portion of the folded bellows assumes a flat configuration located between the rear wall 64 of the folded housing section 14 and the backside of the folded mirror 54. As will become apparent later, when bellows 18 and linkage system 60 are described in more detail, camera 10 is constructed so that mirror 54 essentially is pivoted downwardly ahead of an upper portion of the bellows to clear a bellows folding path and permit the compact folded arrangement of the various components shown in FIG. 5.

Housing section 16 is a clam shell cover section pivotally coupled at its trailing end to a trailing end upstanding section 70 of base section portion 12a at hinge structure 72 for movement between the operative erected position of FIGS. 1, 2 and 4 and the inoperative folded storage position of FIGS. 3 and 5.

Mounted in a receiving well 74 formed in a leading end wall 76 of cover section 16 is a small compact electronic strobe lighting unit 78, best shown in FIG. 1, serving as a source of artificial illumination for flash photography when cover section 16 is at its erected position to position unit 78 above lens 42 so that its light output is directed toward the scene to be photographed.

In the illustrated embodiment, strobe unit 78 is integrated into an automatic exposure control system and preferably is of the variable output type which is automatically fired and quenched at appropriate times during the course of an exposure cycle to provide primary scene lighting or auxiliary light for fill flash exposures. The flash parameters for any given exposure are automatically selected in accordance with various preexposure inputs including ambient scene brightness level and camera-to-scene distance. Representative examples of automatic exposure control systems suitable for use in camera 10 may be found in commonly-assigned U.S. Pat. Nos. 4,074,288; and 4,188,103, and copending applications U.S. Ser. Nos. 262,501 filed on May 11, 1981 and 275,718 filed on June 22, 1981, now U.S. Pat. No. 4,354,748, all of which are incorporated by reference herein.

A longitudinally extending elongated aperture or opening 80 is provided in the top wall 82 of cover 16, along the left side thereof, for accommodating the viewfinder 20.

Viewfinder 20 is of the unified direct viewing Galilean type comprising an elongated lens mounting tube 86 mounting a negative front viewfinder lens 88 at the leading end thereof (see FIG. 4) and an optically aligned positive rear viewfinder lens 90 at the trailing end.

The lens tube 86 is pivotally coupled to cover section 16 at a pair of pivot pins 92, located on a pair of depending side flanges (not shown) near the leading end of opening 80, for movement between its erected and storage positions. Viewfinder 20 is continuously urged to pivot relative to cover section 16 toward its erected position (in a clockwise direction about pins 92 in FIG. 4) by a viewfinder biasing spring such as the illustrated torsion spring 94 that is wound about one of the pins 92 and has one arm 96 thereof attached to cover section 16 and the other arm thereof attached to tube 86.

As will become apparent later, viewfinder 20 is automatically erected to its operative viewing position shown in FIGS. 1, 2 and 4 in response to the manual movement of cover section 16 from its folded or closed position to its erected or open position and, likewise, is folded automatically to assume its storage position shown in FIGS. 3 and 5 when cover section 16 is closed.

Cover section 16 is connected near its forward right-hand end to the lens and shutter housing section 14 by means of an elongated erecting link 104. The upper or forward end of link 104 is pivotally coupled to the interior of cover section side wall 106 at pivot pin 108 thereon, and the lower end of link 104 is pivotally coupled to the right side wall 39 of housing section 14 at pivot pin 110, above and slightly forwardly of the lens and shutter housing pivot 38. A torsion spring 112 wrapped about pin 108 has one arm 114 thereof attached to side wall 106 and the other arm 116 thereof engaged with link 104 to provide a biasing force on link 104 that urges it to pivot in a counterclockwise direction (as viewed in FIGS. 4 and 5) about pin 108.

Base section portion 12a, cover section 16, a link 104 and housing section 14 form a four bar linkage with the pivot centers of hinge structure 72 and pivot pins 38 being fixed centers. Cover section 16 is the driver link, housing section 14 is the follower link, and link 104 is the coupler or connecting rod. In this manner, cover section 16 and housing section 14 are connected in driver/follower relation for coordinated simultaneous movement between their respective erected and folded positions.

To open camera 10, the operator holds base section 12 in one hand and with the other hand grasps the leading ends of cover side walls 106 and lifts cover section 16 upwardly. This causes cover section 16 to pivot in a counterclockwise direction (as viewed in FIGS. 4 and 5) towards its erected position. Link 104 is driven upwardly in response to the motion of cover section 16 and applies a force to housing section 14 at pivot pin 110, located to the left of pivot pin 38 in FIG. 5, producing a clockwise moment or torque on section 14 that causes it to pivot in a clockwise direction about pivot 38 towards its erect position.

The rotational torque applied to housing section 14 continues as cover section 16 moves towards its open position until link 104 and housing section 14 are in a dead center relationship wherein pivots 108, 110 and 38 are linearly aligned along a common line of action extending therethrough. As noted earlier, torsion spring 112 provides a force on link 104 that biases it in a counterclockwise direction about pin 108. When the four bar linkage is at the dead center position it is static but unstable. That is, a rotational force on cover 16 produces a reaction force that is transmitted along the common line of action so that it does not produce any rotational force on either link 104 or housing section 14. However, if either link 104 or housing section 14 is subjected to even a small independently applied rotational force, the pivot 110 will move off the common line of action and the four bar linkage will once again operate in the driver/follower relationship.

In the illustrated embodiment, spring 112 serves as the independent force to pivot link 104 to an over center position. This counterclockwise pivoting motion of link 104 about pivot 108 rotates housing section 14 in the clockwise direction until the lower end of housing forward wall 40 abuts against a rear edge 118 of a top wall section 120 of base section portion 12b. Edge 118 serves as a stop against which housing section 14 abuts to define its upright erected position. Because further clockwise rotation of housing section 14 is inhibited by stop 118, and pivot 110 is offset or beyond a line of action running between pivots 108 and 38, the four bar linkage is stabilized, thereby maintaining housing sections 14 and 16 in their respective erected positions.

To close camera 10, the operator pushes rearwardly on link 104 so it rotates in a clockwise direction about pivot 108 to move pivot 110 through the dead center position to a position on the opposite side of the line of action between pivots 108 and 38. Now, camera 10 may be closed by pivoting cover section 16 downwardly in a clockwise direction about hinge 72 towards its closed position. Through the action of the four bar linkage, housing section 14 is thereby pivoted in a counterclockwise direction about pivot 38 to its folded storage position.

As noted earlier, the mirror assembly, now designated assembly 122, comprises the trapezoidal-shaped mirror 54 and the mirror support frame 55. Support frame 55, as best shown in FIG. 6, includes a flat transverse base plate 124 secured to the backside of mirror 54, near the trailing end thereof, by any suitable means (e.g., adhesive bonding) and the pair of laterally spaced upstanding and rearwardly extending mounting arms 56 thereon. The arms 56 are pivotally connected by pins 58 to a pair of forwardly extending mirror mount supports 126 provided on the interior side of a trailing end wall 128 of base section portion 12a.

The right support arm 56 also includes an integrally formed outwardly extending transverse boss 130 carrying a fixed pin 132 on the outboard end thereof for connecting mirror assembly 122 to the previously-noted linkage system 60 which interconnects assembly 122 with lens and shutter housing 14 for coordinated simultaneous movement between their respective erected and folded positions.

Linkage system 60 comprises an elongated rocker link 134 extending along the right side of base section portion 12a between the left side wall 34 and the facing side of the film receiving chamber 22, and a link driving cam track 136 integrally formed in the bottom portion of the left side wall 39 of the lens and shutter housing 14.

Link 134 pivots, intermediate its opposite ends, about an inwardly extending pin 138 secured to the interior of left side wall 34 for movement between the erected position of FIG. 4 and the folded storage position of FIGS. 5 and 6. Extending forwardly of pin 138 is a forward link section 140 that carries, at its leading end, a fixed transverse pin 142 which extends into and rides along the cam track 136 thereby coupling link 134 to housing section 14. Extending rearwardly from pin 138 is an intermediate link section 144 that is inclined upwardly at a relatively shallow angle with respect to the horizontal forward section 140 (as viewed in FIG. 4), and a trailing end section 146 that is inclined upwardly at a steeper angle than section 144 and includes an inwardly offset portion 148 to position a terminal end 150 thereof adjacent boss 130 so that pin 132 extends through an inclined cam slot 152 to couple the rocker link 134 to mirror assembly 122.

The link driving cam track 136 includes a relatively short inclined mirror pivot section 154 followed by a longer arcuate dwell section 156. All points along dwell section 156 are at a constant radial distance from the pivot pin 38 so that when link pin 142 is riding in this section of track 136 the pin is not displaced with respect to pivot pin 38 or the link pivot pin 138 and there is no pivotal motion imparted to rocker link 134. On the other hand, points along mirror pivot section 154 vary in radial distance from pivot pin 38. This variation increases linearly from the transition zone between sections 154 and 156 to the terminal end of section 154. As pin 142 rides in section 154 in response to rotation of housing section 14, it is displaced vertically with respect to link pivot pin 138 thereby producing pivotal motion in link 134 to rotatably drive the mirror assembly 122.

As best shown in FIG. 5, when camera 10 is in the closed position, pin 142 sits at the terminal end of cam track dwell section 156 with rocker link 134 in its folded position. As camera 10 is opened, housing section 14 pivots in a clockwise manner about pivot 38 in response to the opening motion of cover section 16. Because dwell section 156 is at a constant radial distance from pivot 38, there is no displacement force applied to pin 142 and link 134 and mirror assembly 122 remain in their respective folded positions until housing section 14 is relatively close to its erected position. This allows housing section 14 to clear out of the path of travel of the mirror 54 before the mirror is erected.

In response to further clockwise rotation of housing section 14, pin 142 passes into cam track section 154 and is driven downwardly as it follows the downwardly inclined slope of this portion of the guide channel 136. As a result of this downward pressure on pin 142, link 134 pivots in a clockwise direction about pin 138 thereby lifting the trailing end of link 134 upwardly to apply an upward force on pin 132. This provides a counterclockwise moment on the mirror support frame 55 and it pivots about pin 58 to raise the mirror 54 to the erected position of FIG. 4. With housing section 14 maintained in its upright erected position wherein it is urged into abutment with edge 118 by the over center erecting link 104, the position of pin 142 is fixed in cam track portion 154 thereby fixing the position of link 134. In turn, this fixes the position of mirror 54 in that pin 132 is held at fixed position with the inclined slot 152.

As camera 10 is closed, the sequence of movement of the components is reversed. In response to initial rotation of housing section 14 from its erected position toward its folded position, pin 142 rides in the short track section 154 and is displaced upwardly. This pivots link 134 in a counterclockwise direction about pin 138 to drive mirror assembly 122 downwardly to its folded position. Thereafter, pin 142 enters the dwell section 156 and housing section 14 pivots downwardly without cam track 136 effecting any further displacement of the rocker link 134.

With this linkage system, the movement of mirror 54 and housing section 14 which have intersecting arcs of travel, are coordinated so that they do not interfere with each other while allowing them to be stacked in the interleafed arrangement to make camera 10 more compact in its longitudinal dimension. That is, as the camera is opened, housing section 14 is moved through a major portion of its arc of travel toward the erected position before rotational movement is imparted to mirror 54 to clear housing section 14 out of the mirror's arc of travel. Upon closing the camera, the mirror 54 is moved through a major portion of its arc of travel during only slight rotational movement of housing section 14 away from its erected position to clear the mirror out of the path of travel of housing section 14. Movement of mirror 54 in this manner also clears it out of the folding path of the bellows 18.

There are two distinct functional aspects to bellows 18. The first relates to the photographic process wherein the erected bellows 18 cooperates with the lens and shutter housing 14 and the base section portion 12a to define the ambient light excluding exposure chamber 66 surrounding the exposure optical path between lens 42, mirror surface 62 and the film plane 26. The second relates to its design and structure for automatic movement between its erected and folded positions and, perhaps more importantly, to its integration into the camera folding scheme so that it may be folded into the flat storage configuration without conflict with the other movable camera components.

Bellows 18 preferably is formed of any suitable thin light opaque flexible sheet material such as rubber, vinyl or the like. As best shown in FIGS. 4 and 7, the erected bellows 18 includes a generally rectangular base or bottom peripheral section 158, a forward wall 160, the opposed rear wall 68, a pair of side walls 162 and an accordion pleated top wall 164.

The base section 158 comprises an accordion pleated leading end wall 166, a pair of oppositely spaced planar side walls 168, and a pleated trailing end wall 170. The vertical planar forward wall 160 is set back from the leading end wall 166 behind a short horizontal transverse wall 172 covering the top of the projecting leading end of base section 158.

The base section 158 is secured to the inner frame within portion 12a surrounding the film pack receiving chamber 22; the front wall 160 is secured to the rear wall 64 of the main portion of housing section 14 and the short horizontal wall 172 is secured to a transverse horizontal bottom flange section 174 of housing section 14 intermediate side walls 39. A central recess or cutout (not shown) is provided in flange 174 and the front end of base section 158 to provide clearance for the motor 35 when camera 10 is folded. A central opening 176 is provided in bellows front wall 160, in registration with lens 42, through which image forming light rays are transmitted into the exposure chamber 66.

The side walls 162 incline inwardly as they extend upwardly from peripheral side walls 168 to the top wall 164. Thus, the upper end of the left bellow side walls 162 is inboard of the erected viewfinder 20 providing clearance for it to assume its operative position when the bellows is erected. Forward and rear pleats, as suggested in FIG. 7 at 178 and 180, are provided in side walls 162 to facilitate folding.

The erected bellows rear walls 68 extends upwardly from trailing end wall 170 to top wall 164 and is inclined at approximately 45° with respect to base section 158 to overlie the erected mirror 54.

In a preferred embodiment, a lower section 182 of rear wall 68, below a dotted hinge line H shown in FIG. 7, is adapted to be attached to the facing backside of mirror 54 while an upper section 184 of wall 68, above hinge line H, is not attached to the upper portion of mirror 54 to facilitate folding bellows 18, as will become apparent later.

In the illustrated embodiment, a pair of openings 186 are provided in the rear lateral corners of lower wall section 182 through which the mirror pivot arms 56 extend. The lower section 182 is securely attached to the lower back side of the mirror assembly 122 by means of four (4) L-shaped compression clips 190, three of which are attached to the back side of mirror 54 and one to mirror support frame base plate 124, that extend through a large opening 192 in lower section 182 and engage the edge portions of section 182 surrounding opening 192. Clips 190 urge the bellows material into intimate contact with the back side of the mirror assembly to provide a light tight seal therebetween. In an alternative embodiment, the clips 190 and opening 192 may be eliminated and section 182 may be attached to the lower portion of the mirror assembly by adhesive bonding.

Above the hinge line H, upper section 184 is preferably stiffened to facilitate its pivotal motion about hinge line H when the bellows 18 is moved between its erected and folded positions. In the illustrated embodiment, this is accomplished by providing a stiffening panel 194 on the interior side of section 184. Panel 194 may be formed of cardboard or a stiff plastic material and is secured to the interior surface of section 84 by any suitable method such as adhesive bonding.

As best shown in FIG. 4, when bellows 18 is erected the unattached stiffened section 184 of rear wall 68 overlies the upper free end of mirror 54 with the accordion pleated top wall 164 bridging the gap between the top of the mirror and the rear wall 64 of housing section 14. The pleats are provided in top wall 164 and the end walls 166 and 170 to allow those sections to stretch and contract as the bellows is manipulated to facilitate the folding action and also to accommodate the pivotal movement of components adjacent thereto.

As noted earlier, when the camera is folded, initial counterclockwise rotation of housing section 14 actuates the linkage system 60 causing mirror assembly 122 to pivot down rapidly in a clockwise direction about pivot pins 58 to the folded position of FIG. 5. In response to this motion, the rear portion of the side walls 162 fold along pleats 180 and the attached section 182 of rear wall 68, below hinge line H, is driven downwardly by the mirror assembly through its connection thereto via clips 190. However, the unattached stiffened upper section 184, having its leading end in effect attached to the upper end of housing section 14 by the connecting top wall 164 does not follow the upper end of mirror 54 but rather is constrained by the top wall 164 which is now elongated to accommodate the increased distance between the hinge line H and the point of attachment of top wall 164 to the upper end of housing section 14. Due to the movement of mirror assembly 122 to its folded position, the upper section 184 of bellows 18 in effect is pivoted in a counterclockwise direction about the hinge line H, away from the upper back side of mirror 54 so that it lies in a plane, along with the extended top wall 164, extending between hinge line H and the upper end of the rear wall 64 of housing section 14.

Now, as housing section 14 continues to pivot downwardly towards its closed position, the forward ends of bellows side walls 162 fold along the pleats 178, and the stiffened section 184 and the top wall 164 continue to pivot in a counterclockwise direction about the hinge line H. During this rotation, the stiffened section 184 passes through the over center position (i.e., where it is perpendicular to the plane of mirror 54) and continues downwardly until it is folded back over the lower section 182 in substantially parallel overlying relation thereto with the top wall 164 overlying it in a common plane with bellows front wall 160. Thus, the lower section 182, the stiffened section 184 and the extended top wall 164 assume a Z-fold configuration for flat storage with portions thereof disposed between housing section 14 and mirror 54, overlying the film plane 26.

The pleated rear wall 170 compresses to accommodate the rotational movement of the mirror support frame 55 and the leading end peripheral wall 166 elongates to accommodate the upward displacement of the bottom portion of housing section 14 when it pivots to its folded position.

Upon erecting camera 10, initial clockwise rotation of housing section 14 lifts the top wall 164. This upward motion of top wall 164 causes it to pivot the folded section 184 in a clockwise manner about the hinge line H so that it passes over center and once again is aligned with top wall 164. Now, in response to the action of linkage system 60, the mirror assembly 122 is pivoted upwardly in a counterclockwise direction about pins 58 to erect mirror 54 and the lower section 182 of bellows rear wall 68. This releases the tension in top wall 164 and it contracts to bring the upper stiffened section 184 once again into overlying relation with the upper end of the erected mirror 54.

If one visualizes the individual and collective folding paths of travel of rear wall sections 182 and 184 and top wall 164, it becomes apparent that at least sections 182 and 184 must move through the plane formerly occupied by the erected mirror 54. In order for these bellows sections to assume the flat Z-folded configuration of FIG. 5, mirror 54 must be moved out of the collective folding path ahead of the folding action. Thus, in addition to coordinating the movement of the mirror assembly 122 with housing section 14, the linkage system 60 also coordinates the movement of assembly 122 with the folding action of bellows 18 by moving assembly 122 downwardly towards the film plane 26 ahead of bellows sections 182 and 184 to provide the necessary clearance for the bellows folding motion. Conversely, as the camera is opened, erection of the mirror 54 is delayed so that the bellows sections may move through the erected mirror position as they unfold before mirror 54 is moved into its erected exposure position.

By means of the above-described coordinated movement of the bellows 18, mirror assembly 122 and the lens and shutter housing 14, these components assume a compact folded configuration arranged in stacked relation over the film plane area 26 where the photosensitive image forming area of the forwardmost film unit 25 is to be located in position for exposure. Once arranged in this stacked relation, these components are covered and protected by the closed cover section 16 as best shown in FIG. 3.

As noted earlier, the viewfinder 20 is configured to be automatically erected and folded in response to respectively opening and closing camera 10.

The viewfinder tube 86 is pivotally connected to cover section 16 at pivot pins 92 and torsion spring 94 provides a clockwise (as viewed in FIGS. 4 and 5) or opening biasing force on tube 86 for continuously urging viewfinder 20 toward its erected position with respect to cover section 16.

When camera 10 is erected, viewfinder 20 automatically assumes its operative position with tube 86 disposed in substantially parallel relationship to the film plane 26 and extending forwardly through aperture 80 in the raised cover section 16 to locate the bottom leading end surface 200 of tube 86 in bearing relation to the top locating surface 45 of pillar 44 on housing section 14. When so erected, the rear portion of the tube 86 extends rearwardly behind the exterior surface of cover section top wall 82 to position rear lens 88 at a convenient eye station at the rear of the camera.

The viewfinder 20 is maintained at its operative position by the rotational force exerted on tube 86 by spring 94 which continuously urges tube surface 200 into bearing relation with pillar locating surface 45. Advantageously, the objective lens 42 is mounted on the same structural component of the camera—lens housing 14—as the viewfinder locating surface 45 thereby facilitating the alignment of the exposure and viewing optical systems in an efficient and economical manner which tends to minimize calibration costs during the manufacturing process.

Also, keying the erected position of viewfinder 20 to the locating surface 45 which has a fixed spatial relationship to the objective lens 42 enhances the reliability of repeatedly locating the viewfinder in its correct orientation with the exposure optical system.

To close camera 10, erecting link 104 is released and cover section 16 is manually pivoted downwardly toward its closed position. This causes the lens housing 14 to pivot in a counterclockwise manner toward its folded storage position thereby effecting the folding of the mirror assembly and bellows ahead of it as previously described. As lens housing 14 pivots, the top locating surface 45 of pillar 44 slides out of engagement with the bottom surface 200 of tube 86 bringing the forwarding surface or wall 47 of pillar 44 into position to be engaged by the bottom of the viewfinder tube. Surface 47 now serves as a stop to resist and counteract the biasing force of spring 94 so that the tube 86 pivots in a counterclockwise direction in response to further downward movement of cover section 16. When cover section 16 is fully closed, viewfinder 20 assumes its folded storage position of FIGS. 3 and 5 and within the recess 47a in housing section 14 in overlying relation to the pillar forward wall 47. In a preferred embodiment, the portion of top wall 202 of tube 86 that is seated within aperture 80 when the camera is folded is substantially flush with the exterior surface of top wall 82 of cover section 16 as shown in FIG. 3.

When camera 10 is opened, the viewfinder folding process is reversed. As cover section 16 is raised and lens housing 14 pivots upwardly, forward wall 47 is progressively rotated out of engagement with the underside of the tube 86 and the locating surface 45 rotates into its erected position. As this is happening, the biasing spring pivots tube 86 to maintain its engagement with pillar 44. Thus, in this manner, viewfinder 20 is automatically erected in response to moving cover 16 to its erected position.

Since certain changes may be made in the abovedescribed folding camera without departing from the scope of the invention herein involved, it is intended that all matter contained in the above description or shown in the accompanying drawings shall be interpreted as illustrative and not in a limiting sense.

What is claimed is:

1. A folding camera including a self-erecting and folding viewfinder, said camera comprising:
a base housing section including means for supporting a film unit at a film plane within said base section;
a lens housing section mounting an objective lens and including means configured to be engaged by a viewfinder for locating the viewfinder in a predetermined operative orientation with respect to said objective lens, said lens housing section being pivotally coupled to said base section, adjacent one end thereof, for movement between an upstanding operative erected position and a folded storage position wherein it is folded back over said base housing section in overlying relation to at least a portion of said film plane;
a mirror assembly including a mirror pivotally coupled to said base section, adjacent an opposite end thereof, for movement between an operative erected position for reflecting image-forming light rays from said lens onto said film plane to expose a film unit thereat and a folded storage position overlying at least a portion of said film plane;
a foldable bellows coupled to said base and lens housing sections and said mirror assembly for movement between an erected position for light shielding the exposure optical path extending between said objective lens, mirror and film plane, and a flat storage position wherein at least a portion of said bellows overlies said film plane;
a cover housing section pivotally coupled to said base section adjacent said opposite end thereof for movement between an erected position providing clearance for said lens housing section, mirror assembly and bellows to assume their respective erected positions and a folded storage position overlying said base section and protectively covering said folded lens housing section, mirror assembly and bellows;

first erecting means interconnecting said lens and cover housing sections for coordinated movement between their respective erected and storage positions;

second erecting means interconnecting said lens housing section and said mirror assembly for coordinated movement between their respective erected and storage positions;

a viewfinder pivotally mounted on said cover section for movement between an operative erected position wherein at least a portion of said viewfinder engages said locating means on said lens housing section to locate said viewfinder in said predetermined orientation for viewing and framing a scene in the field of view of said objective lens and a folded storage position wherein at least a portion of said viewfinder overlies a portion of said lens housing section located in its said storage position; and third erecting means, including said locating means, responsive to movement of said cover section from its said storage position to its said erected position for effecting movement of said viewfinder from its said storage position to its said erected position and also responsive to movement of said cover section from its said erected position to its said storage position for effecting movement of said viewfinder from its said erected position to its said storage position.

2. The camera of claim 1 wherein said lens housing section includes a recess therein for receiving at least a portion of said viewfinder when said camera is in its folded storage position.

3. The camera of claim 1 wherein said cover housing section includes an aperture therein, said viewfinder includes an elongated tube mounting a front viewfinder lens at a leading end thereof and a rear viewfinder lens at a trailing end thereof and said viewfinder is mounted on said cover section so as to extend through said aperture with said leading end of said tube in engagement with said locating means when said camera is erected.

4. The camera of claim 3 wherein said third erecting means includes means for spring biasing said viewfinder toward its said erected position so as to urge said leading end of said tube into engagement with said locating means.

5. The camera of claim 4 wherein said locating means includes a bearing surface on said lens housing section arranged in fixed predetermined spatial relation to said objective lens.

6. The camera of claim 5 wherein said bearing surface forms a top wall of a viewfinder supporting and locating pillar on said lens housing section.

7. The camera of claim 6 wherein said lens housing section includes a forward wall having said objective lens mounted thereon and said pillar includes a forward wall that is set back from said lens housing forward wall to define a recess in said lens housing section for receiving at least a portion of said viewfinder when said camera is in its folded storage position.

8. The camera of claim 7 wherein said pillar forward wall serves as part of said third erecting means for selectively engaging and disengaging said lens mounting tube to effect its movement between its said erected and storage positions.

* * * * *